Dec. 13, 1966 W. B. BUEHRLE ETAL 3,292,167

CORE-TRANSISTOR COUNTER

Filed July 29, 1963 3 Sheets-Sheet 1

INVENTORS
William B. Buehrle
Lawrence R. Smith

By Mueller & Aichele
Attorney

INVENTORS:
William B. Buehrle
Lawrence R. Smith
By Mueller & Aichele
Attorney (Strapped-Decade Counter)
(Returns to 0 after 10 Steps)

| Count | Q2 | Q3 | Q4 | Q5 |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 0 | 0 | 0 | 0 | 0 |

INVENTORS:
William B. Buehrle
Lawrence R. Smith
By Mueller & Aichele
Attorney

United States Patent Office 3,292,167

Patented Dec. 13, 1966

3,292,167
CORE-TRANSISTOR COUNTER

William B. Buehrle, Scottsdale, and Lawrence R. Smith, Phoenix, Ariz., assignors to Motorola Inc., Chicago, Ill., a corporation of Illinois Filed July 29, 1963, Ser. No. 298,264
15 Claims. (Cl. 340—174)

The present invention relates to an improved binary counter, and it relates more particularly to an improved binary counter which utilizes multi-apertured magnetic cores and associated circuitry.

A binary counter system utilizing multi-apertured magnetic cores and associated transistor circuitry is described and claimed in copending application Serial No. 202,361, filed June 11, 1962, now Patent Number 3,217,178, in the name of Clence L. Burns.

As described in the copending application, the multi-apertured magnetic cores incorporated into the binary counter are preferably composed of a ferrite material, since such material exhibits essentially rectangular hysteresis loop characteristics. The magnetic cores, in conjunction with the associated windings and transitorized control circuitry provide, in the manner described in the copending application, the desired characteristics to constitute a binary counter.

An object of the present invention is to provide an improved magnetic core type of binary counter of the general type described in the copending Burns application; and which exhibits noise cancellation properties, so as to obviate spurious operation thereof.

Another object of the invention is to provide such an improved magnetic core type of binary counter which is constructed to respond to a single series of input clocking pulses and which does not require a multiplicity of phase-displaced series of pulses in order to perform properly its binary counting function.

Another object of the invention is to provide such an improved magnetic core type of binary counter which may be readily modified to perform decade, or other counting functions, different from a full binary count.

A still further object of the invention is to provide such an improved magnetic core type of binary counter which may be readily constructed to be readily reset to any desired initial count other than zero.

A feature of the invention is the provision of a magnetic core pulse shaper initial stage in a core type counter which serves to isolate the input function of the counter completely from any counting function thereof.

Another feature of the invention is the utilization in the counter to be described of multi-apertured ferrite magnetic cores such as disclosed in copending application Serial No. 109,440, now Patent Number 3,217,300, filed May 11, 1961, in the name of Lawrence R. Smith, so as to achieve a high degree of immunity to noise and spurious operation resulting therefrom.

As described in the above mentioned copending Smith application Serial No. 109,440, magnetic multi-apertured devices, as they are presently known to the art, usually include a core of magnetic material (such as ferrite) of relatively high magnetic retentivity as the fundamental element. In its elemental form, such a magnetic core includes a major aperture of relatively large diameter which defines a closed loop magnetic flux path, and it also includes at least one minor aperture of relatively small diameter which divides the above mentioned flux path into branches.

The multi-apertured magnetic core of the prior art usually provides additional closed loop minor flux paths about the minor apertures which include portions of the branches of the major flux path. The core has input and output windings, and usually additional control windings.

The minor apertures serve to isolate these windings from one another.

The usual prior art multi-apertured core devices have had but limited success as logic elements or data storage elements in the field of data handling and storage. A major problem has been the critical dependency of the prior art core devices on the threshold characteristics of the magnetic material of which they are composed. Because of this dependency, product uniformity and reliability has been difficult to achieve in the fabrication of the usual prior art core devices.

The multi-apertured cores described in the above mentioned copending Smith application Serial No. 109,440, are essentially two core sections in one, and each core section is capable of providing true and complemented outputs simultaneously. These cores are particularly well suited for noise cancellation since the signals induced in the windings thereof can be made to depend upon flux differentials in the core rather than in changes in the over-all flux.

The multi-apertured magnetic cores described in the aforementioned Smith application are conceived so that their dependency on the specific threshold characteristics of the magnetic material of which they are composed is materially reduced. Such cores are used to advantage in the embodiment of the invention to be described. This is because the effect of spurious flux switching in the cores is minimized, as will be explained, and therefore the proper functioning of the units is not highly dependent on magnetic material with clearly defined switching thresholds about the major and minor apertures. Therefore, the multi-apertured magnetic cores utilized in the binary counter to be described can be composed of readily available and relatively inexpensive magnetic materials.

Other features and advantages of the invention will become apparent from a consideration of the following specification, when the specification is considered in conjunction with the accompanying drawings, in which.

Figure 2:
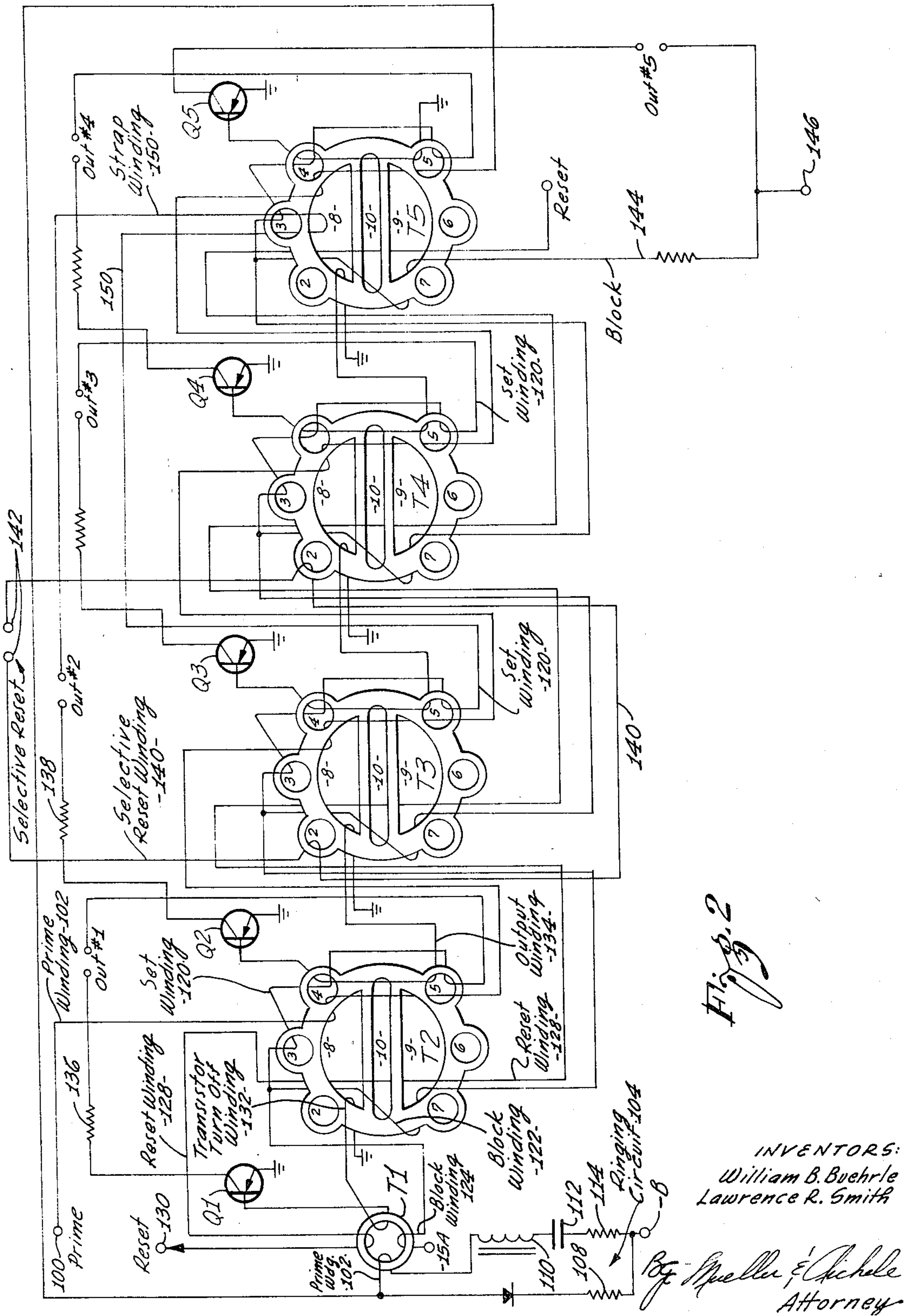
FIGURE 2 is a schematic representation of a binary counter constructed in accordance with the concepts of the present invention, and utilizing multi-apertured magnetic cores of the type illustrated in FIGURES 1A, 1B and 1C.

As described in detail in the copending Smith application Serial No. 109,440, the magnetic cores utilized in the counter of the embodiment of the invention illustrated in FIGURE 2 each has a major aperture which divides the core into two major closed loop flux paths, each of which is capable of storing and transferring binary information. The two flux paths in the core represent the "true" section and the "complement" section of the core.

At any particular time, the signal representing a binary "1" may be stored in one section of the core, and a signal representing a binary "0" is then stored simultaneously in the other section. Each section of the core has an output minor aperture which divides the respective major flux paths into branches, and each section may also have an input minor aperture if desired.

The input and output apertures are linked by corresponding windings, and the magnetic material of the core serves to transfer signals, for example, from the input winding associated with the input aperture to the output winding associated with the output aperture. The information represented by any particular input signal is stored in the form of a flux condition in the magnetic material of each of the core sections during the signal transfer process.

As mentioned in the copending Smith application, one of the most significant advantages of the multi-apertured magnetic cores described therein is that they are not adversely affected by so-called noise flux which may be switched spuriously in the magnetic material. This is accomplished by providing an output winding which passes through the respective output apertures of the two sections of the core in opposite directions and links the minor flux paths about the output apertures in an opposed relationship.

An output representing binary "1" takes the form of a current in one direction in the output winding, and this current is produced when more flux is switched about the output aperture of the "true" section of the core than about the output aperture of the "complemented" section.

An output representing binary "0" information, on the other hand, takes the form of current in the opposite direction in the output winding, and this output is produced when more flux is switched about the output aperture of the complemented section than about the output aperture of the "true" section.

Therefore, the binary operation of the magnetic cores used in the counter of the embodiment of the invention to be described does not rely upon the presence or absence of over-all flux switching in the core, as is usually the case in the prior art devices, but relies upon the flux differential which is switched about the two output apertures of the particular core.

Figures 1A, 1B, 1C:
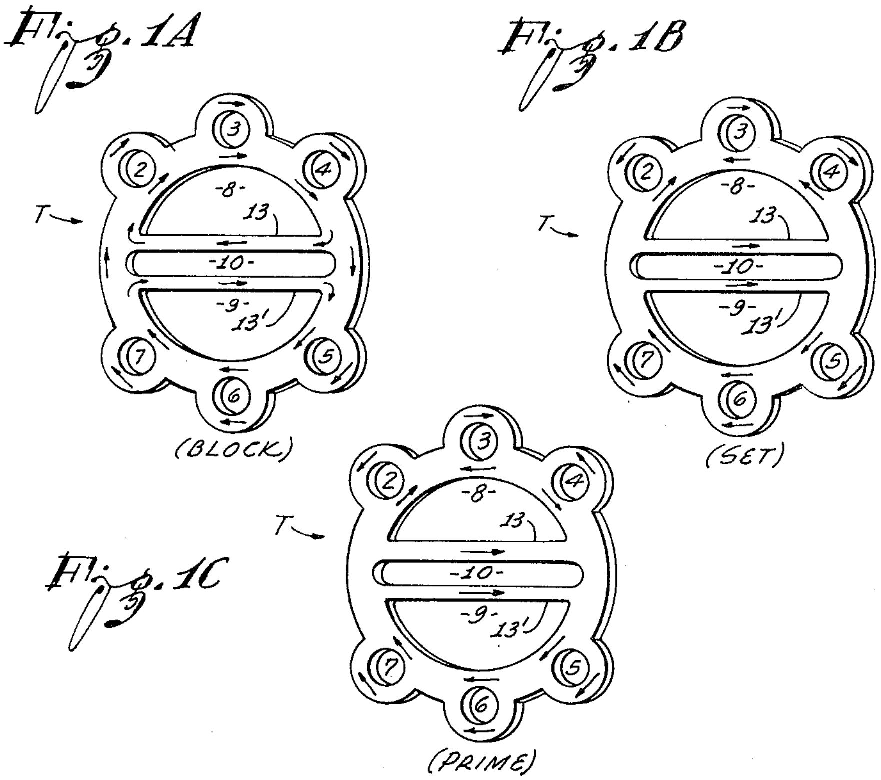
FIGURES 1A, 1B and 1C are schematic representations of the type of multi-apertured core disclosed in the aforementioned Smith application, and respectively illustrate the different flux paths in the core as the core is established in different magnetic conditions.

A typical magnetic core utilized in the counter of FIGURE 2 is illustrated in FIGURES 1A, 1B and 1C. This core is designated T, and it is composed of magnetic material which has a generally square or rectangular hysteresis loop. It may be seen that the upper and lower sections of the core T are symmetrical, and the two sections of the core are formed into distinct sections by an elongated aperture 10. This aperture 10 forms two central legs for the core, designated 13 and 13'. The upper and lower sections of the core of FIGURES 1A, 1B and 1C will be referred to as the "true" and "complement" sections respectively.

There are two major apertures 8 and 9 in the core T, with the aperture 8 being in the "true" section and the aperture 9 being in the "complement" section. These major apertures defined the major flux paths which are illustrated schematically in FIGURES 1A, 1B and 1C.

The smaller, minor apertures which are spaced about the annular portion of the core T divide the major flux path of each section into branches, and there is a minor flux path about each of the smaller apertures. The apertures 2 and 4 are the input and output minor apertures respectively for the "true" section of the core; and the apertures 7 and 5 are the input and output minor apertures respectively for the complement" section of the core. The other two minor apertures 3 and 6 may be used as either input or output apertures as desired.

During the operation of the binary counter to be described, each multi-apertured magnetic core utilized in the counter undergoes three distinctive flux conditions; these conditions being shown in FIGURES 1A, 1B and 1C. At the outset, all the cores of the counter are usually set in a "block" or "cleared" condition, insofar as the upper, or "true" sections are concerned.

It should be pointed out that insofar as the counter to be described is concerned, only the upper or "true" section of each core is used for signal transferring purposes, and the lower "complement" sections are used only for flux noise cancellation. Therefore, when it is stated that, as shown in FIGURE 1A, the flux condition in each core is in the "blocked" condition, this represents the condition of the upper true section of the core.

As a second condition, the upper section of the core is established in the "set" conditions of FIGURE 1B. When the core is in the set condition, the flux pattern takes the form shown in FIGURE 1B. The core characteristics are such that an output current of the proper polarity is provided in the output windings of any particular core, by the establishment of that core from the "set" condition of FIGURE 1B to the "prime" condition of FIGURE 1C.

It will become evident as the description proceeds that no core can be set to the "primed" condition of FIGURE 1C at which an output is produced, unless it has first been established in the "set" condition of FIGURE 1B. It will also become evident, that the circuitry to be described is such that whenever a particular core is set to the prime condition of FIGURE 1B, so as to produce an output from that particular stage of the counter, all preceding cores in the counter are returned to the cleared or blocked condition of FIGURE 1A.

In the circuit of FIGURE 2, the clock pulses which prime and thereby actuate the counter circuit are introduced to an input terminal 100. These clock pulses will be referred to as "priming" pulses, in that after respective ones of the cores have been "set," they serve to prime the various cores of the counter to produce outputs, as will be described.

The prime input terminal 100 is connected to a prime winding 102 which links the minor output apertures 4 and 5 of each of the cores $T_2$, $T_3$, $T_4$ and $T_5$ which make up the binary counter. The prime output winding 102 passing through the minor output aperture 4 of each of the cores has one turn, and it likewise has one turn in passing through the minor output aperture 5 for magnetic noise cancellation purposes. The prime output winding 102 also extends around an annular pulse shaper core $T_1$, and it has eight turns on the shaper core.

The prime output winding 102 is terminated in a ringing circuit 104. This ringing circuit includes a diode 106, the cathode of which is connected to a resistor 108. The ringing circuit also includes an inductance coil 110 and a series capacitor 112.

The capacitor 112 may, for example, have a capacity of .1 microfarad, and it is connected to a resistor 114. The resistors 108 and 114 may each have a resistance of 12 ohms. The resistors are connected to the negative terminal B— of a unidirectional direct current exciting source.

The purpose of the ringing circuit 104 is to produce a sharp pulse at the trailing edge of each of the priming pulses applied to the input terminal 100. These priming pulses are represented by the upper series of pulses in the timing diagram of FIGURE 3. The sharp pulses produced by the ringing circuit 104 cause the binary counter to be activated at the trailing edge of each of the input priming pulses.

The binary counter also includes a set winding 120 which extends through the minor apertures 3, 4 and 5 of each of the cores $T_2$, $T_3$, $T_4$ and $T_5$. This set winding has, for example, four turns about the aperture 3, one turn about the aperture 4, and one turn about the aperture 5. The set winding associated with the core $T_2$ is connected to the output terminals designated "Out #1."

The set winding 120 is connected to a block winding 122. The block winding 122 extends through the major aperture 8 of the upper section of the core $T_2$ with four turns, and it extends in the opposite sense, for noise cancellation purposes, with four turns, through the major aperture 9 of the lower section. The block winding 122 and the set winding 120 connect back to a block winding 124 on the annular shaper core $T_1$, the latter winding having four turns. The remote end of the block winding 124 is connected, for example, to the negative terminal of a fifteen ampere source of unidirectional current.

The binary counter of FIGURE 2 also includes a reset winding 128 which links the major apertures 8 and 9 on the cores $T_2$, $T_3$, $T_4$ and $T_5$. Both major apertures are excited by this winding to maintain the noise cancelling capability of the output winding 102 which links the outer leg true and complement major magnetic paths in opposite directions. The reset winding also links the annular shaper core $T_1$. The reset winding 128 has six turns, for example, on the annular core $T_1$, and it has four turns on each section of each of the cores $T_2$, $T_3$, $T_4$ and $T_5$. The reset winding 128 responds to a reset signal applied to the terminal 130 to place all the cores in the "blocked" condition.

Each of the cores $T_1$–$T_5$ of the binary counter of FIGURE 2 has a transistor associated with it. These transistors may, for example, be of the PNP type designated 2N652. The transistor associated with the annular shaper core $T_1$ is designated $Q_1$; the transistor associated with the core $T_2$ is designated $Q_2$; the transistor associated with the core $T_3$ is designated $Q_3$; the transistor associated with the core $T_5$ is designated $Q_5$. Each of the transistors $Q_1$–$Q_5$ has its emitter connected to ground.

A turn-off winding 132 extends through the major aperture 8 of the upper section of the core $T_2$. One end of this winding 132 is grounded; and the other end thereof extends around the pulse shaper core $T_1$, and is connected to the base of the transistor $Q_1$. This transistor turn-off winding may have three turns on the core $T_2$, and it may have six turns on the core $T_1$.

An output winding 134 extends through the minor output apertures 4 and 5 of the core $T_2$, in opposite directions for noise cancellation purposes. This output winding 134 may have six turns, for example, around the aperture 4 and six turns around the aperture 5. One end of the output winding 134 is connected to the base of the transistor $Q_2$, and the other end of this winding extends to ground through the major aperture 8 of the core $T_3$ as a turn-off winding for the transistor $Q_2$.

The transistor $Q_1$ is connected through a resistor 136 to the output terminals #1. The resistor 136 may have a resistance of 12 ohms. The collector of the transistor $Q_2$ is connected through a 12 ohm resistor 138 to the output terminals #2.

Similar windings to the above described windings 102, 120, 122, 124, 128, 132 and 134 are associated with the cores $T_3$, $T_4$ and $T_5$. In addition, a selective reset winding 140 may be incorporated in any one or more of the cores. This selective reset winding will set selected cores to the "one" state which, in combination with the reset winding 128, will permit the counter to be reset to a condition other than zero.

The selective reset winding is designated 140, and in the circuit of FIGURE 2, this winding is shown as passing through the apertures 2 of the cores $T_3$ and $T_4$. The selective reset winding is connected to a pair of terminals 142 across which a selective reset signal is applied for the selective reset purposes described above.

The block winding 144 of the core $T_5$ may be used as a general reset winding, since a current through this winding serves to return all the preceding cores to the "blocked" condition. Therefore, a reset signal may be applied to a terminal 146 connected to the block winding 144, if so desired.

As mentioned above, the counter of the present invention is adaptable to be returned to its original "blocked" or "zero" condition after any particular count, less than the full binary count, which can be expressed as the sum of two binary numbers. In the illustrated embodiment, the counter is strapped so as to function as a decade counter, and to return to zero after that count equivalent to decimal 10 has been reached.

The strap winding is designated 150 in FIGURE 2, and this winding extends from the set winding 120 of the core $T_3$ through the major aperture of the upper section of the core $T_5$ and back to the output terminals #2.

It should be reiterated that the lower section of each if the multi-apertured magnetic cores $T_2$, $T_3$, $T_4$ and $T_5$ is used only for noise cancellation purposes, and that all binary signal translation is carried out in the upper sections. It is for noise cancellation purposes that the prime winding 102, the set winding 120, the block winding 122, and the output winding 134, extend through apertures in both the upper and lower sections of each core.

It should be pointed out that to achieve a counter capable of operating accurately under conditions normally encountered, it is essential that the above mentioned windings extend through the apertures in the upper and lower sections of the corresponding cores so that the noise cancellation may be achieved. Without the noise cancellation provisions of the system of FIGURE 2, the transistors $Q_2$, $Q_3$, $Q_4$ and $Q_5$ would be readily susceptible to spurious operation which would destroy the counting effectiveness of the counter. It should also be pointed out that it would be impractical to substitute two distinct cores for the upper and lower sections of each of the cores $T_2$, $T_3$, $T_4$ or $T_5$, unless, in each instance, the two cores are perfectly matched.

As mentioned above, as a usual initial condition, all the cores $T_1$, $T_2$, $T_3$, $T_4$ and $T_5$ are in the "blocked," "cleared," or "zero" condition. An exception to this would be when the counter is to be strapped at a particular initial count, at which time the selective reset provided by the winding 140 serves to return certain cores to a set condition after they have been reset by the reset winding 128.

The first priming current pulse applied to the input terminal 100 when all the cores are in their "blocked" condition passes through the prime winding 102 which is associated with all the cores $T_2$, $T_3$, $T_4$ and $T_5$. However, this first prime pulse has no effect on the counter system, since during the normal initial zero condition of the counter, none of the cores has been set. This is true because the prime winding 102 produces a magnetomotive force in a sense further to saturate the inside leg of the minor output apertures 4 and 5, and since these legs are already saturated in this sense, no further switching is possible.

The first priming pulse is applied by the winding 102 to the ringing circuit 104, which is over-damped. The resulting signal established in the ringing circuit 104 causes a current to flow through the prime winding of the pulse shaper core $T_1$ in a direction to cause the transistor $Q_1$ to become conductive at the trailing edge of the first priming pulse. This causes an output pulse $Q_1$ to be produced at the output terminals #1, as shown in the timing diagram of FIGURE 3. This output pulse $Q_1$ also flows through the set winding 120 of the core $T_2$ in a direction to set the core. The current also flows through the block winding 124 back to the pulse shaper core $T_1$ to return that core to its original "blocked" condition.

Therefore, the first pulse applied to the prime input terminal 100 serves to produce a first output pulse at the output terminals #1, the first output pulse being timed with the trailing edge of the first input priming pulse, and this first input priming pulse also serves to set the core $T_2$. It should be pointed out that the flux switched in the core $T_2$ by current in the set winding 120 will not link the output winding 134 which is connected to the base of the transistor $Q_2$, and therefore will not cause the transistor $Q_2$ to conduct.

However, the next priming pusle applied to the input terminal 100, after the setting of the core and which flows through the prime winding 102 to the ringing circuit 104, is such that the current flowing through the winding adjacent the minor output aperture 4 is of a polarity to cause the flux to switch in a counter-clockwise direction locally around the minor output aperture 4 of the core $T_2$. This latter switching of the flux around the minor aperture 4 induces a voltage in the winding 134, and this voltage has a polarity to bias the transistor $Q_2$ further into its non-conductive region, so that this transistor will not conduct during the prime cycle. However, the trailing edge of this priming pulse causes the transistor $Q_1$ to conduct due to the action of the ringing circuit. When transistor $Q_1$ fires, a current pulse is produced in the set winding 120 which passes through apertures 3, 4 and 5. This current switches the flux locally about aperture 4 back in the clockwise direction. The latter flux switching about the aperture 4 is of a sense to induce a voltage on the base of the transistor $Q_2$ of polarity to cause transistor $Q_2$ to fire.

Then the next, or third priming pulse, applied to the terminal 100 will switch the flux in the counter clockwise direction about the minor aperture 4 of the core $T_3$. However, as explained above, this will induce a voltage in the output winding 134 of the opposite polarity to that required to cause the transistor $Q_3$ to conduct.

At the trailing edge of the third input priming pulse, the transistor $Q_1$ will again conduct and again set the core $T_1$. However, since the transistor $Q_2$ is not conductive, the flux about the minor aperture 4 of the core $T_3$ remains in the counter clockwise sense and, therefore, the transistor $Q_3$ is not caused to become conductive.

A fourth input priming pulse will switch the flux around the minor aperture 4 of the core $T_2$ in the counter clockwise sense. This latter priming pulse also attempts to switch the flux around the minor aperture 4 of the core $T_3$ in the counter clockwise sense, but the latter flux is already in that state due to the action of the third input priming pulse.

The conduction of the transistor $Q_1$ at the trailing edge of the fourth input priming pulse will cause the flux around the minor aperture 4 of the core $T_2$ to switch in the clockwise sense, and this induces a voltage in the output winding 134 of the proper polarity to cause the transistor $Q_2$ to conduct. The conductivity of the transistor $Q_2$ will switch the flux around the minor aperture 4 of the core $T_3$ in the clockwise sense, causing the transistor $Q_3$ to conduct. The resulting collector current of the transistor $Q_3$ will set the core $T_4$ and return the core $T_3$ to its "zero," or "blocked," state. This collector current will also add to the collector current of the transistor $Q_2$ in the block winding 122 to return the core $T_2$ to its original "zero" or "blocked" state.

The collector current of the transistor $Q_2$ and of the transistor $Q_3$ also adds to the collector current of the transistor $Q_1$ in the block winding 124 of the core $T_1$ to return the core $T_1$ to its original "zero" or "blocked" state.

The resetting of the core $T_3$ to its blocked state induces a voltage in the turn-off winding 132 of the core $T_3$ which subtracts from the voltage induced in the output winding 134 of the core $T_2$. Since the base of the transistor $Q_2$ acts as a diode during the resulting conduction cycle it will clamp the composite voltage induced in the windings 132 and 134 of the core $T_3$ to approximately 0.5 volt (assuming that the transistor $Q_2$ is a germanium transistor).

Since the voltage induced in the winding 132 of the core $T_3$ is subtracted from the voltage in the winding 134 of the core $T_2$, the latter voltage will increase to maintain the above-mentioned clamped level. This increased voltage permits the core $T_2$ to switch faster than the core $T_3$ since there is no voltage being subtracted from the induced voltage of the winding 134 of the core $T_3$. Consequently, the transistor $Q_2$ will be returned to its non-conductive state before the return of the transistor $Q_3$.

In the above described manner the pulse shaper core $T_1$ is blocked after each priming pulse. The trailing edge of each priming input pulse causes the transistor $Q_1$ to fire so as to produce the output pulses $Q_1$ of FIGURE 3 at the output terminals #1. The core $T_2$, on the other hand, is set on alternate pulses $Q_1$, and it is blocked for alternate pulses $Q_1$; so that the transistor $Q_2$ is fired at the trailing edge of every second priming pulse, as shown by the pulses $Q_2$ of the diagram of FIGURE 3. In like manner, and as described, the transistor $Q_3$ is fired at the trailing edge of every fourth priming pulse to produce the output pulses $Q_3$ of FIGURE 3, and the transistor $Q_4$ is fired at the trailing edge of every eighth priming pulse to produce the output pulses $Q_4$ of FIGURE 3.

Figure 3:
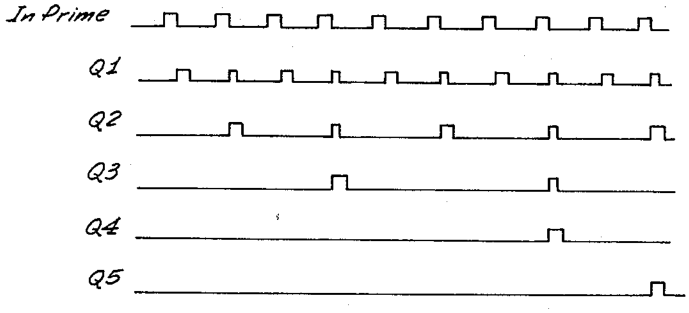
FIGURE 3 is a timing diagram useful in explaining the operation of the counter of FIGURE 2.
Figures 4, 5:
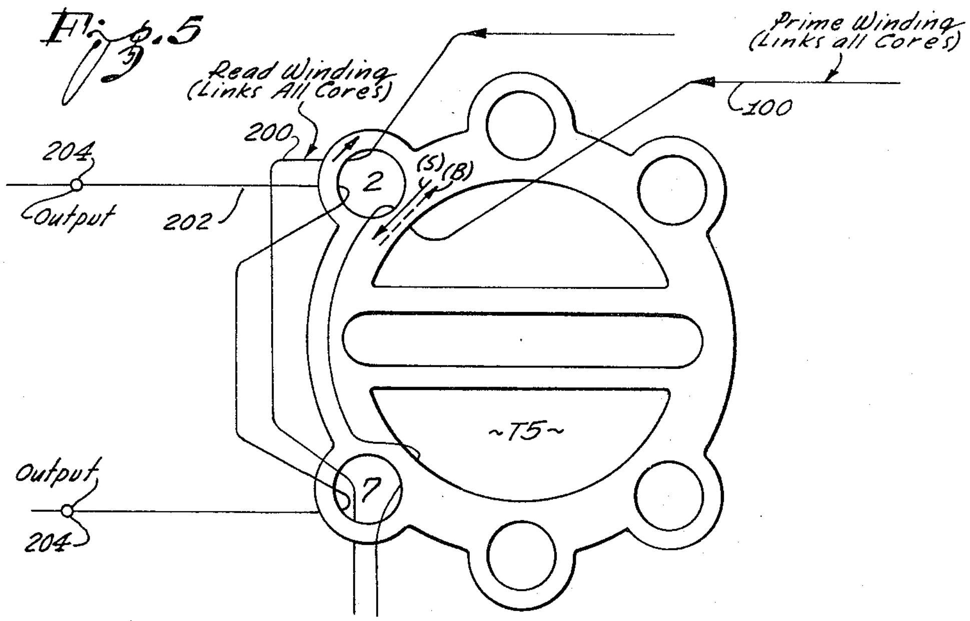
FIGURE 4 is a table illustrating the various steps of the counter of FIGURE 2, the counter being strapped to operate in a decade manner.
FIGURE 5 is a schematic representation of an appropriate non-destructive read-out winding system for any one of the cores of the counter of FIGURE 2.

Therefore, the counter of FIGURE 3 proceeds initially in the usual sequence of the binary counter, and in accordance with the table of FIGURE 4. As mentioned above, the counter is controlled in the particular illustrated configuration of FIGURE 2 to function as a decade counter and to return to zero after ten steps. This is achieved, in the described manner, by the strap winding 150 extending through the aperture 3 of the core $T_5$.

Whenever the transistor $Q_2$ fires, so as to produce an output at the terminals #2 the resulting block current flows through the strap winding 150 to return the core $T_5$ to the blocked condition. During the first seven steps of the counter, and as shown in the table of FIGURE 4 this block current has no effect on the core $T_5$, because that core is already in the blocked or "zero" condition.

At the eighth step of the counter, the transistor $Q_2$ will turn off ahead of the transistor $Q_4$, as previously explained, so that the core $T_5$ is left in its set condition. However, the next time $Q_2$ is rendered conductive, during the tenth step a current is produced in the strap winding 150. This latter current causes the core $T_5$ to return to the blocked, or "zero," condition, causing the transistor $Q_5$ to conduct, as shown in FIGURE 4. The transistor $Q_5$ will then reset the core $T_3$ which was set by the firing of the transistor $Q_2$. The counter is, therefore, now returned to its initial zero condition.

It will be noted that when any one of the transistors $Q_1$, $Q_2$, $Q_3$ or $Q_4$ is fired during the priming of its corresponding core, this causes the next adjacent core on the right in FIGURE 2 to be set. This setting of the next adjacent core causes all the preceding cores to the left thereof in FIGURE 2 to return to the blocked condition.

It is important that the setting current of any core be terminated at least no later than the blocking current of that core, or else there is a likelihood that the core may become reset when it should be maintained in the blocked condition.

The transistor turn-off winding 132 prevents such a condition from arising. This is achieved because when the core $T_2$, for example, is returned to its blocked condition, the resulting current through the winding 132 immediately causes the transistor $Q_1$ to be cut off, so as to terminate the set current through the set winding 120. It is this action of the turn-off winding 132 which causes alternate pulses of the pulse trains $Q_1$, $Q_2$, $Q_3$, $Q_4$ and $Q_5$ in the diagram of FIGURE 3 to be relatively narrow. It will be appreciated that similar transistor turn-off windings are associated with the cores $T_3$, $T_4$ and $T_5$.

Therefore, every set pulse produced by the transistor $Q_1$, for example, when the core $T_2$ is blocked, will appear across the output terminals #1 with normal width. However, every set pulse produced by the transistor $Q_1$ when the core $T_2$ is in the prime condition will have a narrower width, because the resulting switching in the core $T_2$ causes that core to return to the blocked condition, and this serves to produce a current in the winding 132 which turns off the transistor $Q_1$ before the pulse across the output terminal has achieved its normal width. This means that each output pulse from the counter at any of the stages will be alternately broad and narrow. The pulses at the output terminals #5 are an exception to this, because the transistor $Q_5$ does not have a current suppress turn-off winding.

As noted above, the embodiment of the invention shown in FIGURE 2 is a four stage binary counter. Under normal binary counting conditions, this would be an 8421 counter. In the particular example, the summation of 8 and 2 was taken to give a decade output. Therefore, for every ten inputs with the particular example, a single output is produced at the output terminals #5. It is obvious that the counter could be strapped for any other particular count, expressed as the sum of two binary numbers, other than the decade count illustrated in FIGURE 2.

Likewise, the counter illustrated in FIGURE 2 is capable of being preset prior to counting, as mentioned above. In the illustrated embodiment, and as described, the selective preset winding 140 links the cores $T_3$ and $T_4$. If a current is passed through this winding, then upon the initiation of the count cycle, an output is produced at the output terminals #5 after four counts, rather than ten. This is because the counter in this particular instance is preset at decimal "6," rather than "0."

It will be appreciated that the set winding 120 extends through three apertures in each core, that is, the apertures 3, 4 and 5 in, for example, the core $T_2$. As mentioned above, the linkage of the winding with the upper and the lower apertures is for noise cancellation purposes. However, an additional function is achieved by linking the set windings to the output aperture 4. This is to assure that no flux spillage will occur so as to produce a current in the output winding 134 at any time prior to the actual previous setting of the core in question to the primed condition. When a set current passes through the set winding 120 during a time when a core, such as the core $T_2$ is in the blocked condition, the current through the minor output aperture 4 is in a direction to strengthen the blocked condition of the core, so as to assure that no current is produced in the output winding 134 during that condition.

A "non-destruct" output winding may be provided for any one of the cores in the counter of FIGURE 2. Such an output winding is indicated as associated with the core $T_5$, for example, in FIGURE 5. For this purpose, the apertures 2 and 7 in the upper and lower sections of the core may be used.

The prime winding 100 is passed through the minor apertures 2 and 7 for noise cancellation purposes. A read winding 200 is passed through the aperture 2. The output winding 202 is passed through the minor apertures 2 and 7 in opposite directions for noise cancellation purposes, and the output winding is connected to output terminals 204 at which the output appears.

At any particular time, a current through the read winding 200 produces an indication across the output terminals 204 as to whether the particular core is in the "1" or "0" condition. When the core is in the "1" condition, the priming current through the winding 200 causes a local switching of the flux about the minor aperture 2. A read pulse current through the read winding 200 is caused to follow closely after the priming pulse through the prime winding 100.

If the core were in the "1" condition, the prime winding would produce a local switching of the flux around the #2 minor aperture, as mentioned above, and the read pulse would cause the core to be switched back to its original condition. The latter switching of the flux produces a current of proper polarity in the output winding 202 to produce an indication that the core $T_5$ is in the "1" condition. Also, the core is left in exactly the same flux condition at the termination of the read operation, so that the action is non-destructive. If the core $T_5$ is in the "0" or "block" condition, it follows that the prime pulse produces no switching of the flux, so that the read pulse likewise does not produce switching.

The invention provides, therefore, an improved binary counter which uses multi-apertured magnetic cores. An important advantage of the counter of the present invention is that the use of particular types of cores provides for noise cancellation in the system, so that accurate and reliable operation is achieved. Moreover, the system of the invention is advantageous in that it may be clocked by a single series of priming pulses.

While a particular embodiment of the invention has been shown and describetd, modifications may be made, and it is intended in the claims to cover all such modifications which fall within the scope of the invention.

What is claimed is:

1. In a binary counter, the combination of: core means of magnetic material having relatively high flux retentivity properties, said core means having first and second major magnetic sections therein which are adapted to be magnetized independently of one another, said core means having a major aperture in each of said magnetic sections and having input and output minor apertures in each of said magnetic sections; a set winding mounted on said core means and extending through the input aperture of one of said magnetic sections; an output winding mounted on said core means and extending through the output apertures in each of said magnetic sections; a prime winding mounted on said core means and extending through said output apertures in each of said magnetic sections; first means for introducing a signal to said set winding to establish a predetermined set flux condition about the output aperture in said first magnetic section; and second means for introducing a signal to said prime winding to revert said predetermined set flux condition about the output aperture in said first magnetic section and thereby induce a signal in said output winding.

2. The combination defined in claim 1 in which said set winding further extends through said output apertures in said first and second magnetic sections.

3. The combination defined in claim 1 and which includes a block winding extending through the major apertures in said first and second magnetic sections; and third means for introducing a signal to said block winding to establish the flux in said first magnetic section in a blocked condition.

4. In a binary counter, the combination of: core means of magnetic material having relatively high flux retentivity properties, said core means having first and second major magnetic sections therein which are adapted to be magnetized independently of one another, said core means having a major aperture in each of said magnetic sections and having input and output minor apertures in each of said magnetic sections; a set winding mounted on said core means and extending through the input aperture of one of said magnetic sections; an output winding mounted on said core means and extending through the output apertures in each of said magnetic sections; a prime winding mounted on said core means and extending through said output apertures in each of said magnetic sections; first means including a transistor for introducing a signal to said set winding to establish a predetermined set flux condition about the output aperture in said first magnetic section; second means for introducing a signal to said prime winding to reverse said predetermined set flux condition about the output aperture in said first magnetic circuit and thereby induce a signal of a particular polarity in said output winding; a block winding extending through the major apertures in said first and second magnetic sections; and third means for introducing a signal to said block winding to establish the flux in said first magnetic section in a blocked condition.

5. The combination defined in claim 4 and which includes a turn-off winding mounted on said core and extending through the major aperture in said first magnetic circuit, and means connecting said turn-off winding to said transistor to drive said transistor to a non-conductive condition when the flux in said first magnetic circuit is established in said blocked condition.

6. A magnetic unit for storing and transferring binary information including in combination: core means of magnetic material having relatively high flux retentivity properties, said core means having first and second major magnetic sections therein which are adapted to be magnetized independently of one another, said core means having a major aperture in each of said magnetic sections and having input and output minor apertures in each of said magnetic sections; a set winding mounted on said core means and extending through the output aperture of one of said magnetic sections; an output winding mounted on said core means and extending through the output apertures in each of said magnetic sections; a prime winding mounted on said core means and extending through said output apertures in each of said magnetic sections; first means for introducing a signal to said set winding to establish a predetermined set flux condition about the output aperture in said first magnetic section; and second means for introducing a signal to said prime winding to reverse said predetermined flux condition about the output aperture in said first magnetic section and thereby induce a signal of a particular polarity in said output winding.

7. The combination defined in claim 6 in which said set winding further extends through said output apertures in said first and second magnetic sections.

8. The combination defined in claim 6 and which includes a block winding extending through the major apertures in said first and second magnetic sections; and third means for introducing a signal to said block winding to establish the flux in said first magnetic circuit in a blocked condition.

9. A binary counter including in combination: a plurality of cores of magnetic material each having relatively high flux retentivity properties, each of said cores having first and second major magnetic sections therein which are adapted to be magnetized independently of one another, each of said cores having a major aperture in each of said magnetic sections and having input and output minor apertures in each of said magnetic sections; a set winding mounted on each of said cores and extending through the input aperture of one of said magnetic sections; an output winding mounted on each of said cores and extending through the output apertures in each of said magnetic sections; circuit means including a transistor coupling the output winding of each of said cores to the set winding of a successive one of said cores; a prime winding mounted on said cores and linking said cores and extending through said output apertures in each of said magnetic circuits of respective ones of said cores; first means for introducing a set signal to the set winding of a first of said cores to establish a predetermined set flux condition about the output aperture in said first magnetic circuit thereof; and second means for introducing a prime pulse signal to said prime winding to reverse said predetermined set flux condition about said output apertures of said first of said cores and thereby to induce a signal in the output winding.

10. The binary counter defined in claim 9 in which said first introducing means includes a further core of magnetic material having relatively high flux retentivity properties, in which said prime winding links said further core, and which includes an output winding on said further core and means including a transistor coupling said last named output winding to the set winding of said first of said cores.

11. The binary counter defined in claim 9 and which includes a block winding on each of said cores and on said further core, each of said block windings being connected to respective ones of said set windings so that the establishment of the flux in said first magnetic section of any one of said cores to the set condition causes the flux in said first magnetic section of all preceding ones of said cores to be established in a predetermined blocked condition.

12. The binary counter defined in claim 9 and which includes a resonant ringing circuit coupled to said prime winding to produce a sharp pulse at the trailing edge of each pulse of said prime signal.

13. The binary counter defined in claim 9 and which includes a reset winding extending in opposite directions through the major apertures of each of said first and second magnetic sections of each of said cores.

14. The binary counter defined in claim 9 in which at least one of said cores has a further minor aperture therein, and which includes a selective reset winding extending through said further minor aperture for resetting the corresponding core to said predetermined blocked condition.

15. The binary counter defined in claim 9 and which includes a strap winding extending from the output winding of one of said cores through an aperture in a further one of said cores to set the flux in said further one of said cores at a blocked condition when the flux in said first one of said cores is established at said set condition.

References Cited by the Examiner

UNITED STATES PATENTS 2,935,622 5/1960 Crane ______________ 340—174

OTHER REFERENCES

Publication I, "Variable Compensation for Magnetic Circuit," by Ergott, IBM Technical Disclosure Bulletin, volume 3, No. 2, July 1960, page 62.

TERRELL W. FEARS, *Acting Primary Examiner.*

S. URYNOWICZ, *Assistant Examiner.*